United States Patent
Chen et al.

(10) Patent No.: US 8,817,596 B2
(45) Date of Patent: Aug. 26, 2014

(54) PROTECTING INGRESS AND EGRESS OF A LABEL SWITCHED PATH

(75) Inventors: Huaimo Chen, Bolton, MA (US); Qianglin Quintin Zhao, Boxborough, MA (US)

(73) Assignee: Futurewei Technologies, Inc., Plano, TX (US)

( * ) Notice: Subject to any disclaimer, the term of this patent is extended or adjusted under 35 U.S.C. 154(b) by 388 days.

(21) Appl. No.: 12/683,968

(22) Filed: Jan. 7, 2010

(65) Prior Publication Data

US 2010/0177631 A1 Jul. 15, 2010

Related U.S. Application Data

(60) Provisional application No. 61/143,592, filed on Jan. 9, 2009.

(51) Int. Cl.
*G01R 31/08* (2006.01)
*H04L 12/28* (2006.01)

(52) U.S. Cl.
USPC ............ 370/221; 370/256; 370/389; 370/408

(58) Field of Classification Search
None
See application file for complete search history.

(56) References Cited

U.S. PATENT DOCUMENTS

| | | | |
|---|---|---|---|
| 6,751,190 B1 | 6/2004 | Swallow | |
| 7,269,132 B1 | 9/2007 | Casey et al. | |
| 7,286,467 B1 | 10/2007 | Sylvain | |
| 7,345,991 B1 | 3/2008 | Shabtay et al. | |
| 7,586,841 B2 * | 9/2009 | Vasseur | 370/218 |
| 7,886,079 B2 | 2/2011 | Vasseur | |
| 8,331,220 B2 | 12/2012 | Kitada | |
| 2003/0117952 A1 | 6/2003 | Ueno et al. | |
| 2003/0123446 A1 | 7/2003 | Muirhead | |
| 2006/0159009 A1 * | 7/2006 | Kim et al. | 370/216 |

(Continued)

FOREIGN PATENT DOCUMENTS

| | | |
|---|---|---|
| CN | 1805412 A | 7/2006 |
| CN | 1852244 A | 10/2006 |

(Continued)

OTHER PUBLICATIONS

Bradner, S., "Key Words for Use in RFCs to Indicate Requirement Levels," RFC 2119, Mar. 1997, 3 pages.

(Continued)

*Primary Examiner* — Jutai Kao
(74) *Attorney, Agent, or Firm* — Conley Rose, P.C.; Grant Rodolph; William H. Dietrich

(57) ABSTRACT

An apparatus comprising a backup node coupled to an ingress node of a point-to-multipoint (P2MP) label switched path (LSP) and to a plurality of next-hop nodes of the ingress node of the P2MP LSP via a backup tree, wherein the backup node and the ingress node are both coupled to an external node, and wherein the backup node is configured to ensure data delivery in the P2MP LSP when the ingress node fails. Included is a network component comprising at least one processor configured to implement a method comprising detecting a failure in an ingress node of a P2MP LSP, receiving a data packet destined for the ingress node and to be transported by the P2MP LSP from a provider node when the ingress node fails, and transmitting the data packet on a backup tree that merges with the P2MP LSP prior to reaching an egress node.

31 Claims, 10 Drawing Sheets

(56) References Cited

U.S. PATENT DOCUMENTS

| | | | |
|---|---|---|---|
| 2006/0268682 A1 | 11/2006 | Vasseur | |
| 2007/0019558 A1 | 1/2007 | Vasseur et al. | |
| 2007/0019954 A1* | 1/2007 | Lu et al. | 398/51 |
| 2007/0047556 A1 | 3/2007 | Raahemi et al. | |
| 2007/0076720 A1 | 4/2007 | Wu | |
| 2007/0091792 A1* | 4/2007 | Chandra et al. | 370/227 |
| 2007/0133406 A1 | 6/2007 | Vasseur | |
| 2007/0165515 A1 | 7/2007 | Vasseur | |
| 2007/0180105 A1* | 8/2007 | Filsfils et al. | 709/224 |
| 2007/0201355 A1* | 8/2007 | Vasseur et al. | 370/217 |
| 2007/0253326 A1 | 11/2007 | Saha et al. | |
| 2007/0280102 A1 | 12/2007 | Vasseur et al. | |
| 2008/0076720 A1 | 3/2008 | Xie et al. | |
| 2008/0123521 A1 | 5/2008 | Vasseur et al. | |
| 2008/0123524 A1 | 5/2008 | Vasseur et al. | |
| 2008/0205282 A1* | 8/2008 | Huang | 370/237 |
| 2008/0219272 A1 | 9/2008 | Novello et al. | |
| 2009/0219806 A1 | 9/2009 | Chen et al. | |
| 2010/0008222 A1* | 1/2010 | Le Roux et al. | 370/228 |
| 2010/0039939 A1 | 2/2010 | Wang | |
| 2010/0146149 A1 | 6/2010 | Vasseur et al. | |
| 2010/0189115 A1 | 7/2010 | Kitada | |
| 2010/0323000 A1 | 12/2010 | Ali et al. | |
| 2012/0044801 A1* | 2/2012 | Vasseur et al. | 370/217 |
| 2013/0235716 A1* | 9/2013 | Vasseur | 370/221 |

FOREIGN PATENT DOCUMENTS

| | | |
|---|---|---|
| CN | 101163105 A | 4/2008 |
| CN | 101228739 A | 7/2008 |
| WO | 2008043374 A1 | 4/2008 |
| WO | WO 2008037917 A1 * | 4/2008 |
| WO | 2008120267 A1 | 10/2008 |

OTHER PUBLICATIONS

Braden, R. Ed., et al., "Resource Reservation Protocol (RSVP)—Version 1 Functional Specification," RFC 2205, Sep. 1997, 112 pages.

Awduche, D., et al., "Requirements for Traffic Engineering Over MPLS," RFC 2702, Sep. 1999, 29 pages.

Rosen, E., et al., "Multiprotocol Label Switching Architecture," RFC 3031, Jan. 2001, 57 pages.

Rosen, E., et al., "MPLS Label Stack Encoding," RFC 3032, Jan. 2001, 22 pages.

Berger, L., "Generalized Multi-Protocol Label Switching (GMPLS) Signaling Resource Reservation Protocol-Traffic Engineering (RSVP-TE) Extensions," RFC 3473, Jan. 2003, 43 pages.

Narten, T., "Assigning Experimental and Testing Numbers Considered Useful," RFC 3692, Jan. 2004, 8 pages.

Yasukawa, S., Ed., "Signaling Requirements for Point-to-Multipoint Traffic-Engineered MPLS Label Switched Paths (LSPs)," RFC 4461, Apr. 2006, 30 pages.

Le Roux, J.L., et al., "P2MP MPLS-TE Fast Reroute with P2MP Bypass Tunnels," draft-leroux-mpls-p2mp-te-bypass-01.txt, Mar. 2007, 12 pages.

Foreign Communication From a Related Counterpart Application, European Application 10700352.7, European Office Action dated Jun. 10, 2011, 6 pages.

Foreign Communication From a Related Counterpart Application, European Application 10700352.7, European Office Action dated Mar. 9, 2012, 5 pages.

Pan, P., Ed., et al., "Fast Reroute Extensions to RSVP-TE for LSP Tunnels," RFC 4090, May 2005.

Awduche, D., et al., "RSVP-TE: Extensions to RSVP for LSP Tunnels," RFC 3209, Dec. 2001.

Aggarwal, R., Ed., et al., "Extensions to Resource Reservation Protocol—Traffic Engineering (RSVP-TE) for Point-to-Multipoint TE Label Switched Paths (LSPs)," RFC 4875, May 2007.

Foreign Communication from a Counter-part Application, PCT application PCT/US2010/020462, International Search Report and Written Opinion, Apr. 8, 2010, 13 pages.

Foreign Communication From a Related Counterpart Application, European Application No. 10700352.7, European Office Action dated Aug. 29, 2012, 3 pages.

Foreign Communication From a Related Counterpart Application, Japanese Application No. 2011523222, Japanese Office Action dated Sep. 14, 2012, 2 pages.

Foreign Communication From a Related Counterpart Application, Japanese Application No. 2011523222, Partial Translation of Japanese Office Action dated Sep. 14, 2012, 2 pages.

Foreign Communication From a Counterpart Application, Japanese Application No. 2011-523222, Japanese Notice of Allowance dated Jan. 29, 2013, 3 pages.

Foreign Communication From a Counterpart Application, Japanese Application No. 2011-523222, Partial English Translation of Japanese Notice of Allowance dated Jan. 29, 2013, 1 page.

Foreign Communication from a Counterpart Application, Chinese Application No. 201080003837.1, Office Action dated Feb. 27, 2013, 5 pages.

Foreign Communication from a Counterpart Application, Chinese Application No. 201080003837.1, Partial Translation Office Action dated Feb. 27, 2013, 7 pages.

Cao, W., et al., "Head Node Protection Extension to RSVP-TE for LSP Tunnels," draft-cao-mpls-te-p2mp-head-protection-01.txt, Nov. 17, 2007, 18 pages.

Chen, H., "Extensions to the Path Computation Element Communication Protocol (PCEP) for Backup Ingress of a Traffic Engineering Label Switched Path," draft-chen-pce-compute-backup-ingress-01.txt, Mar. 12, 2011, 13 pages.

Chen, H., "Extensions to the Path Computation Element Communication Protocol (PCEP) for Backup Ingress of a Traffic Engineering Label Switched Path," draft-chen-pce-compute-backup-ingress-00.txt, Oct. 18, 2010, 13 pages.

Chen, H., "Extensions to Path Computation Element Communication Protocol (PCEP) for Backup Ingress of a Traffic Engineering Label Switched Path," draft-chen-pce-compute-backup-ingress-05.txt, Feb. 25, 2013, 14 pages.

Farrel, A., et al., "A Path Computation Element (PCE) Based Architecture," RFC 4655, Aug. 2006, 38 pages.

Vasseur, E.d., J.P., et al., "Path Computation Element (PCE) Communication Protocol (PCEP)—Version 1," draft-ietf-pce-pcep-03, Oct. 18, 2006, 65 pages.

Vasseur, Ed., JP., et al., "Path Computation Element (PCE) Communication Protocol (PCEP)," RFC 5440, Mar. 2009, 88 pages.

Yasukawa, S., et al., "Path Computation Clients (PCC)—Path Computation Element (PCE) Requirements for Point-to-Multipoint (MPLS-TE)," RFC 5862, Jun. 2010, 11 pages.

Zhao, Ed., Q., et al., "Extensions to the Path Computation Element Communication Protocol (PCEP) for Point-to-Multipoint Traffic Engineering Label Switched Paths," draft-ietf-pce-pcep-p2mp-extensions-06.txt, Dec. 30, 2009, 31 pages.

Zhao, Ed., Q., et al., "Extensions to the Path Computation Element Communication Protocol (PCEP) for Point-to-Multipoint Traffic Engineering Label Switched Paths," RFC 6006, Sep. 2010, 33 pages.

Foreign Communication From a Counterpart Application, PCT Application PCT/CN2011/071358, International Search Report dated Jun. 9, 2011, 3 pages.

Foreign Communication From a Counterpart Application, PCT Application PCT/CN2011/071358, Written Opinion dated Jun. 9, 2011, 4 pages.

Foreign Communication From a Counterpart Application, European Application No. 11746859.5, Extended European Search Report dated Feb. 8, 2013, 8 pages.

Office Action dated Apr. 24, 2013, 39 pages, U.S. Appl. No. 13/033,125, filed Feb. 23, 2011.

Foreign Communication From a Counterpart Application, European Application No. 13170910.7, Extended European Search Report dated Aug. 29, 2013, 9 pages.

Foreign Communication From a Counterpart Application, Chinese Application No. 201080003837.1, Chinese Office Action dated Sep. 26, 2013, 5 pages.

* cited by examiner

PROTECTING INGRESS AND EGRESS OF A LABEL SWITCHED PATH

CROSS-REFERENCE TO RELATED APPLICATIONS

The present application claims priority to U.S. Provisional Patent Application No. 61/143,592 filed Jan. 9, 2009 by Huaimo Chen et al. and entitled "System and Method for Protecting Ingress and Egress of a Label Switched Path," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks and Generalized MPLS (GMPLS) networks, a Traffic Engineering (TE) Label Switched Path (LSP) can be established using a Resource Reservation Protocol-TE (RSVP-TE) for a given path. A path can be provided by a Path Computation Client (PCC) and/or a Path Computation Element (PCE). For example, the PCC may request a path or route from the PCE, which computes the path and forwards the computed path information back to the PCC. The path can be a point-to-point (P2P) path, which comprises a plurality of nodes and/or Label Switch Routers (LSRs) and extends from a source node or LSR to a destination node or LSR. Alternatively, the path can be a Point-to-Multipoint (P2MP) path that extends from the source node to a plurality of destination nodes. The RSVP-TE can also be used to establish backup P2P and P2MP LSPs to reroute packets during network link or internal node failures and thus guarantee packet delivery.

The Internet Engineering Task Force (IETF) request for comment (RFC) 4090 entitled "Fast Reroute Extensions to RSVP-TE for LSP Tunnels", which is published in http://ietfreport.isoc.org/rfc/rfc4090.txt and incorporated herein by reference, describes two methods to backup P2P LSP tunnels or paths at local repair points. The local repair points may comprise a plurality of internal nodes between an ingress node and an egress node along the path. The first method is a one-to-one backup method, where a detour backup P2P LSP for each protected P2P LSP is created at each potential point of local repair. The second method is a facility bypass backup protection method, where a bypass backup P2P LSP tunnel is created using MPLS label stacking to protect a potential failure point for a set of P2P LSP tunnels. The bypass backup tunnel can protect a set of P2P LSPs that have similar backup constraints. However, neither of the two methods can protect an ingress or an egress node failure for a protected P2P LSP locally. Further, the IETF RFC 4875 entitled "Extensions to RSVP-TE for Point-to-Multipoint TE Label Switched Paths (LSPs)", which is published in http://ietfreport.isoc.org/rfc/rfc4875.txt and incorporated herein by reference, describes how to use the one-to-one backup method and facility bypass backup method to protect a link or internal node failure on the path of a P2MP LSP. However, there is no mention of protecting locally an ingress or egress node failure in a protected P2MP LSP.

SUMMARY

In one embodiment, the disclosure includes an apparatus comprising a backup node coupled to an ingress node of a P2MP LSP and to a plurality of next-hop nodes of the ingress node of the P2MP LSP via a backup tree, wherein the backup node and the ingress node are both coupled to an external node, and wherein the backup node is configured to ensure data delivery in the P2MP LSP when the ingress node fails.

In another embodiment, the disclosure includes a network component comprising at least one processor configured to implement a method comprising detecting a failure in an ingress node of a P2MP LSP, receiving a data packet destined for the ingress node and to be transported by the P2MP LSP from a provider node when the ingress node fails, and transmitting the data packet on a backup tree that merges with the P2MP LSP prior to reaching an egress node.

In yet another embodiment, the disclosure includes a method comprising detecting a failure in an egress node of a P2MP LSP, and transmitting a data packet destined for the egress node and to be forwarded to a client on a backup LSP to a backup egress node when the egress node fails.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for protecting an ingress node failure and/or an egress node failure in a TE LSP. The TE LSP may be a P2MP LSP. The P2MP LSP may comprise an ingress node, a plurality of internal nodes, and a plurality of egress nodes. The ingress node and egress nodes may be edge nodes in a network. A backup ingress node, which may be an edge node, may be designated to protect the ingress node. The backup ingress node may also communicate with the ingress node and detect a failure of the ingress node. When the ingress node fails, the backup ingress node may receive traffic destined for the ingress node and to be transported by the P2MP LSP, and forward the traffic to a plurality of next-hop nodes of the ingress node of the P2MP LSP. The traffic may be forwarded from the backup ingress node via a backup tree, such as a plurality of P2P bypass tunnels, a plurality of P2P detour tunnels, or a P2MP bypass tunnel. Similarly, a backup egress node, which may be an edge node, may be designated to protect an egress node. An internal node, which may precede the egress node along the P2MP LSP, may communicate with the backup egress node and detect a failure of the egress node. When the egress node fails, the internal node may forward traffic, which may be destined to the egress node, to the backup egress node instead of the egress node. The traffic may be forwarded from the internal node via a backup LSP, such as a P2P bypass tunnel or a P2P detour tunnel. During an ingress node failure, the traffic may be routed via the backup tree and then merged into the P2MP LSP, e.g. without using a second backup P2MP LSP from the backup ingress to the egress nodes, which may save system resources and improves recovery time.

Figure 1:
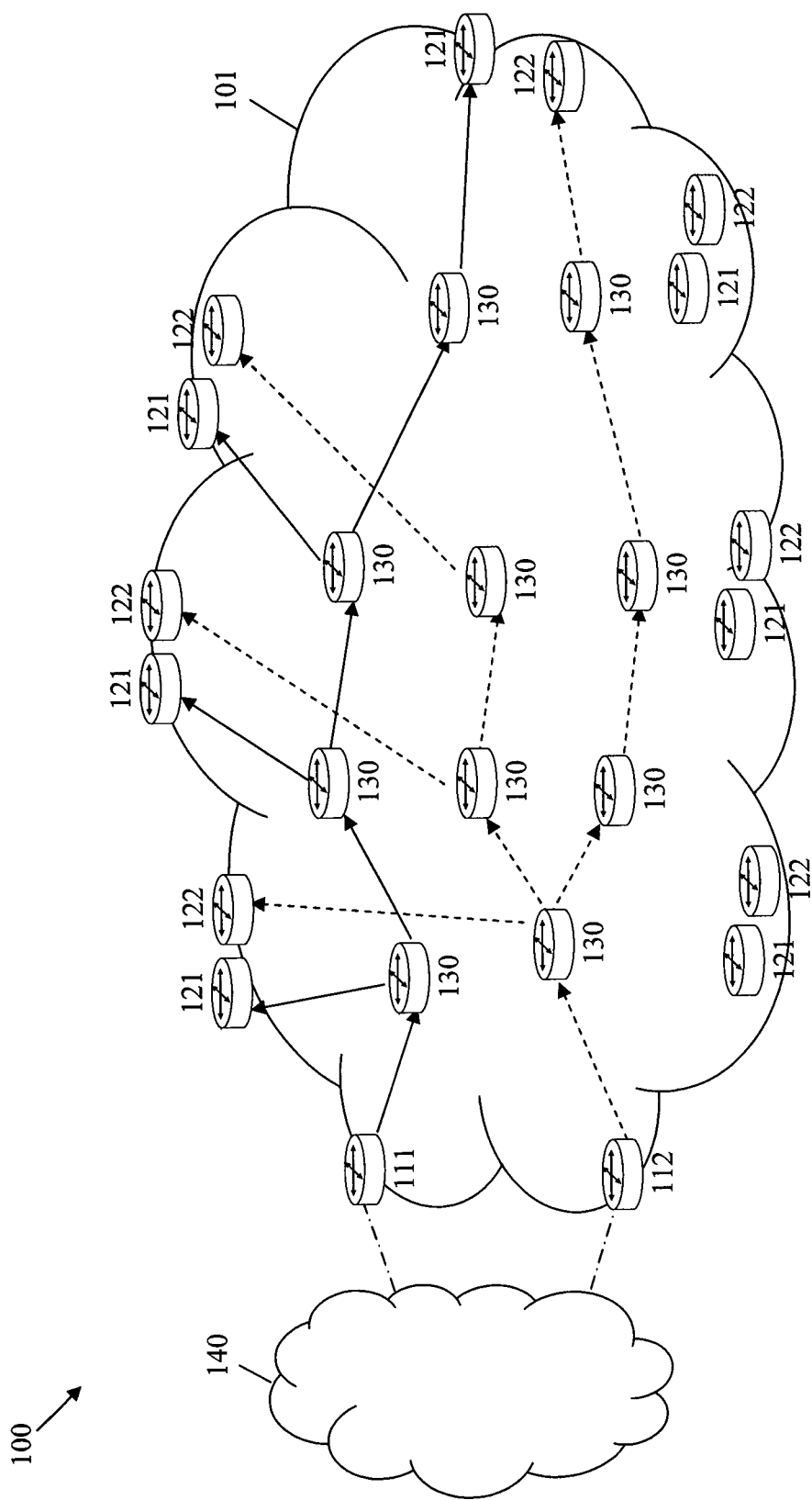
FIG. 1 is a schematic diagram of an embodiment of a label switched system.

FIG. 1 illustrates one embodiment of a label switched system 100, where a plurality of P2P LSPs and P2MP LSPs may be established between at least some of the components. The P2P LSPs and P2MP LSPs may be used to transport data traffic, e.g. using packets and packet labels for routing. The label switched system 100 may comprise a label switched network 101, which may be a packet switched network that transports data traffic using packets or frames along network paths or routes. The packets may be routed or switched along the paths, which may be established by a label switching protocol, such as MPLS or GMPLS.

The label switched network 101 may comprise a plurality of edge nodes, including a first ingress node 111, a second ingress node 112, a plurality of first egress nodes 121, and a plurality of second egress nodes 122. When a P2MP LSP in the label switched network 101 comprises at least some of the edge nodes, the first ingress node 111 and second ingress node 112 may be referred to as root nodes, and the first egress nodes 121 and second egress nodes 122 may be referred to as leaf nodes. Additionally, the label switched network 101 may comprise a plurality of internal nodes 130, which may communicate with one another and with the edge nodes. The first ingress node 111 and the second ingress node 112 may communicate with a first external network 140, such as an Internet protocol (IP) network, which may be coupled to the label switched network 101. As such, the first ingress node 111 and the second ingress node 112 may transport data, e.g. data packets, between the label switch network 101 and the external network 140. Further, some of the first egress nodes 121 and second egress nodes 122 may be grouped in pairs, where each pair may be coupled to a second external network or a client (not shown).

In an embodiment, the edge nodes and internal nodes 130 may be any devices or components that support transportation of the packets through the label switched network 101. For example, the network nodes may include switches, routers, or various combinations of such devices. The network nodes may receive packets from other network nodes, comprise logic circuitry that determines which network nodes to send the packets to, and transmit the packets to the other network nodes. In some embodiments, at least some of the network nodes may be label switched routers (LSRs), which may be configured to modify or update the labels of the packets transported in the label switched network 101. Further, at least some of the edge nodes may be label edge routers (LERs), which may be configured to insert or remove the labels of the packets transported between the label switched network 101 and the external network 140.

The label switched network 101 may comprise a first P2MP LSP, which may be established to multicast data traffic from the first external network 140 to the second external networks or clients. The first P2MP LSP may comprise the first ingress node 111 and at least some of the first egress nodes 121. The first P2MP LSP is shown using solid arrow lines in FIG. 1.

Typically, to protect the first P2MP LSP against link or node failures, the label switched network 101 may comprise a second P2MP LSP, which may comprise the second ingress node 112 and at least some of the second egress nodes 122. Specifically, each second egress node 122 may be paired with a first egress node 121 of the first P2MP LSP. The second P2MP LSP may also comprise the same and/or different internal nodes 130. The second P2MP LSP may provide a backup path to the first P2MP LSP and may be used to forward traffic from the first external network 140 to the second external networks or clients when the ingress node or any egress node of first P2MP LSP fails. The second P2MP LSP is shown using dashed arrow lines in FIG. 1.

Reserving a second P2MP LSP as a backup path to the first P2MP LSP may be resource consuming since the second P2MP LSP may require additional network bandwidth, which may be comparable to the reserved bandwidth of the first P2MP LSP. Further, when the ingress node of the first P2MP LSP fails, rerouting traffic via a corresponding second P2MP LSP may cause a delay in traffic delivery. Even when the second P2MP LSP carries the same traffic as the first P2MP LSP, when the ingress node of the first P2MP LSP fails, the delay for a second external network or a client to determine the failure and switch to a second egress node for receiving the traffic may be long. Such delay may not be acceptable in some systems, e.g. for real time services such as IP television (IPTV).

Figure 2:
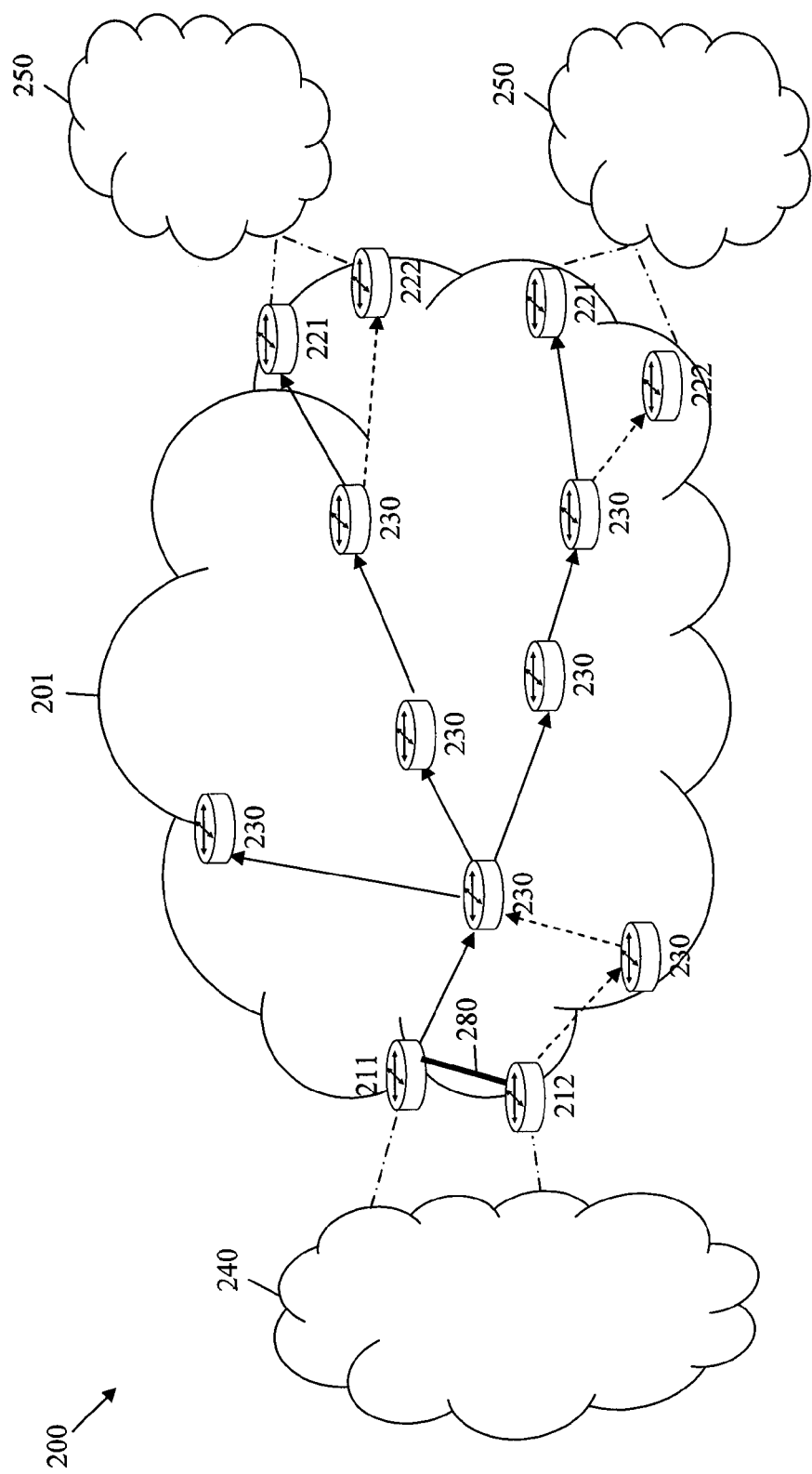
FIG. 2 is a schematic diagram of another embodiment of the label switched system.

FIG. 2 illustrates one embodiment of another label switched system 200, where a plurality of TE LSPs may be established between at least some of the components. The label switched system 200 may comprise a label switched network 201, which may be a packet switched network. The label switched network 201 may comprise a plurality of edge nodes, which may comprise a first ingress node 211, a second ingress node 212, a plurality of first egress nodes 221, and a plurality of second egress nodes 222. Additionally, the label switched network 201 may comprise a plurality of internal nodes 230, which may communicate with one another and with the edge nodes. The edge nodes and the internal nodes 230 may be configured substantially similar to the corresponding components of the label switch network 101.

The label switch network 201 may communicate with a first external network 240 via the first ingress node 211 and the second ingress node 212, and with a plurality of second external networks 250 via the first egress nodes 221 and the second egress nodes 222. Specifically, the label switch network 201 may communicate with each of the second external networks 250 via a first egress node 221 and second egress node 222. Alternatively, the first egress node 221 and second egress node 222 may communicate with a client.

The label switched network 201 may comprise a P2MP LSP, which may be established to multicast data traffic from the first external network 240 to the second external networks 250, or alternatively to clients coupled to the label switched network 201. The P2MP LSP may comprise the first ingress node 211 and at least some of the first egress nodes 221. The P2MP LSP may also comprise a plurality of internal nodes 230. In an embodiment, the second ingress node 212 may be designated as a backup node for the first ingress node 211 to protect the P2MP LSP against ingress node failure. Accordingly, the second ingress node 212 may be configured to communicate with the first ingress node 211, establish a backup LSP or a plurality of backup LSPs for protecting the first ingress node 211, and route packets to be sent to the first ingress node 211 and to be transported by the P2MP LSP via the backup LSP or the plurality of backup LSPs and then subsequently merge the packets into the P2MP LSP when the first ingress node 211 fails.

The second ingress node 212 may be selected using a PCE, for instance based on network topology information. The PCE may inform the first ingress node 211 of the selected second ingress node 212. The first ingress node 211 may then communicate with the second ingress node 212, e.g. by establishing a communication channel with the second ingress node 212. Thus, the first ingress node 211 may send information about the P2MP LSP to the second ingress node 212. The information sent to the second ingress node 212 may comprise constrains on the P2MP LSP, an Explicit Route Object (ERO), a Record Route Object (RRO), a Fast Reroute Object (FRO), a detour object, or combinations thereof. The information may be sent in an Open Shortest Path First (OSPF) type 9 Link State Advertisement (LSA) with a new Type Length Value (TLV) for the information. Alternatively, the information may be sent in a RSVP-TE PATH message with a new flag indicating that the information in the message is for protecting the ingress node. The second ingress node 212 may receive this information from the first ingress node 211 and use the information to establish a backup LSP or a plurality of backup LSPs. For instance, the second ingress node 212 may initiate a backup LSP from the second ingress node 212 to a next-hop node of the first ingress node 211 of the P2MP LSP. The second ingress node 212 may be aware of the next-hop node from the RRO that may be sent from the first ingress node 211. The backup LSP may be created by computing a path from the second ingress node 212 to the next-hop node, sending a PATH message along the computed path, receiving a reservation (RESV) message in return, and creating a forwarding state (e.g. table) for the backup LSP. The PATH and RESV messages may be similar to the PATH and RESV messages defined by IETF. The backup LSP may be a P2P bypass tunnel, a P2P detour tunnel, or a P2MP bypass tunnel, as described below.

After selecting the second ingress node 212 as a backup node for the first ingress node 211, the second ingress node 212 may be configured to detect a failure in the first ingress node 211 using a failure detection mechanism. For instance, the failure detection mechanism may be a Bi-directional Forwarding Detection (BFD) over an interface 280 or a P2P LSP, which may be established between the first ingress node 211 and the second ingress node 212. When the second ingress node 212 detects a failure in the first ingress node 211, the second ingress node 212 may receive the traffic, e.g. from the first external network 240, and then forward the traffic via the backup LSP to the next-hop node in the P2MP LSP. In an embodiment, if the traffic is initially received by both the first ingress node 211 and the second ingress node 212, then the second ingress node 212 may also forward the traffic via the backup LSP or the plurality of backup LSPs to the next-hop nodes of the first ingress node of the P2MP LSP upon detecting a failure in the first ingress node 211.

Additionally, at least some of the second egress nodes 222, which may be paired with the first egress nodes 221, may be designated as backup nodes for the first egress nodes 221 to protect against egress node failure. Accordingly, a previous-hop node that may precede a first egress node 221 along the P2MP LSP may be configured to receive information about a second egress node 222, establish a backup LSP for the first egress node 221 and route packets to be sent to the first egress node 221 via the backup LSP to the second egress node 222.

The second egress node 222 may be selected using a PCE, for instance based on network topology information. The PCE may inform the first egress node 221 of the selected second egress node 222. Additionally or alternatively, the PCE may inform the first ingress node 211 of the selected second egress node 222. The information about the second egress node 222 may then be sent, e.g. by a network management entity, to the first egress node 221 and/or the previous-hop node of the first egress node 221. The information about the second egress node 222 may be sent to the previous-hop node in a message. For instance, when the first egress node 221 has the information about the selected second egress node 222, the first egress node 221 may send the information to the previous-hop node, e.g. in a RESV message. The first egress node may send the information about forwarding the data received from the P2MP LSP to the client to the second egress node in an OSPF type 9 LSA with a TLV for the information. The second egress node may create a forwarding entry according to the information received for forwarding the data to the client. Alternatively, the first egress node may send the backup egress node the information about forwarding the data received from the P2MP LSP to the client via the previous-hop node of the egress node in a RSVP-TE RESV message and then the previous-hop node sends the second egress node the information in a RSVP-TE PATH message. If the first ingress node 211 has the information about the selected second egress node 222, then the first ingress node 211 may send the information to the previous-hop node, e.g. in a PATH message.

After receiving the message, the previous-hop node may establish a backup LSP from the previous-hop node to the second egress node 222. The backup LSP may be created by computing a path from the previous-hop node to the second egress node 222, sending the PATH message along the computed path, receiving a RESV message in return, and creating a forwarding state (e.g. table) for the backup LSP. The backup LSP may be a P2P bypass tunnel or a P2P detour tunnel, as described below. When the previous-hop node detects a failure in the first egress node 221, the previous-hop node may forward the traffic, via the backup LSP, to the second egress node 222 instead of the first egress node 221. The second egress node 222 may then deliver the traffic to its destination, e.g. to the second external network 250 or a client.

Selecting a backup ingress node for the first ingress node 211 and/or a backup egress node for any of the first egress nodes 221 may provide end-to-end protection in a P2MP LSP. By using the backup ingress and/or egress nodes, the end-to-end P2MP LSP protection may be localized to the initially configured (or primary) ingress and/or egress nodes of the P2MP LSP. This localized protection may provide more efficient protection to the edge nodes in comparison to using a second backup P2MP LSP from a second ingress node to all second egress nodes when an ingress or egress node fails. For instance, creating backup LSPs from the backup ingress to the next-hop nodes of the first ingress node of the P2MP LSP and/or a backup LSP from the previous-hop of an egress node to a second backup egress node may require fewer network resources, e.g. in terms of reserved bandwidth, than creating a second backup P2MP LSP from the second ingress node to all the second egress nodes. Additionally, routing the traffic locally via the backup nodes and backup LSPs, in the case of node failure, may be faster and simpler to implement than routing traffic along the second backup P2MP LSP.

Figure 3:
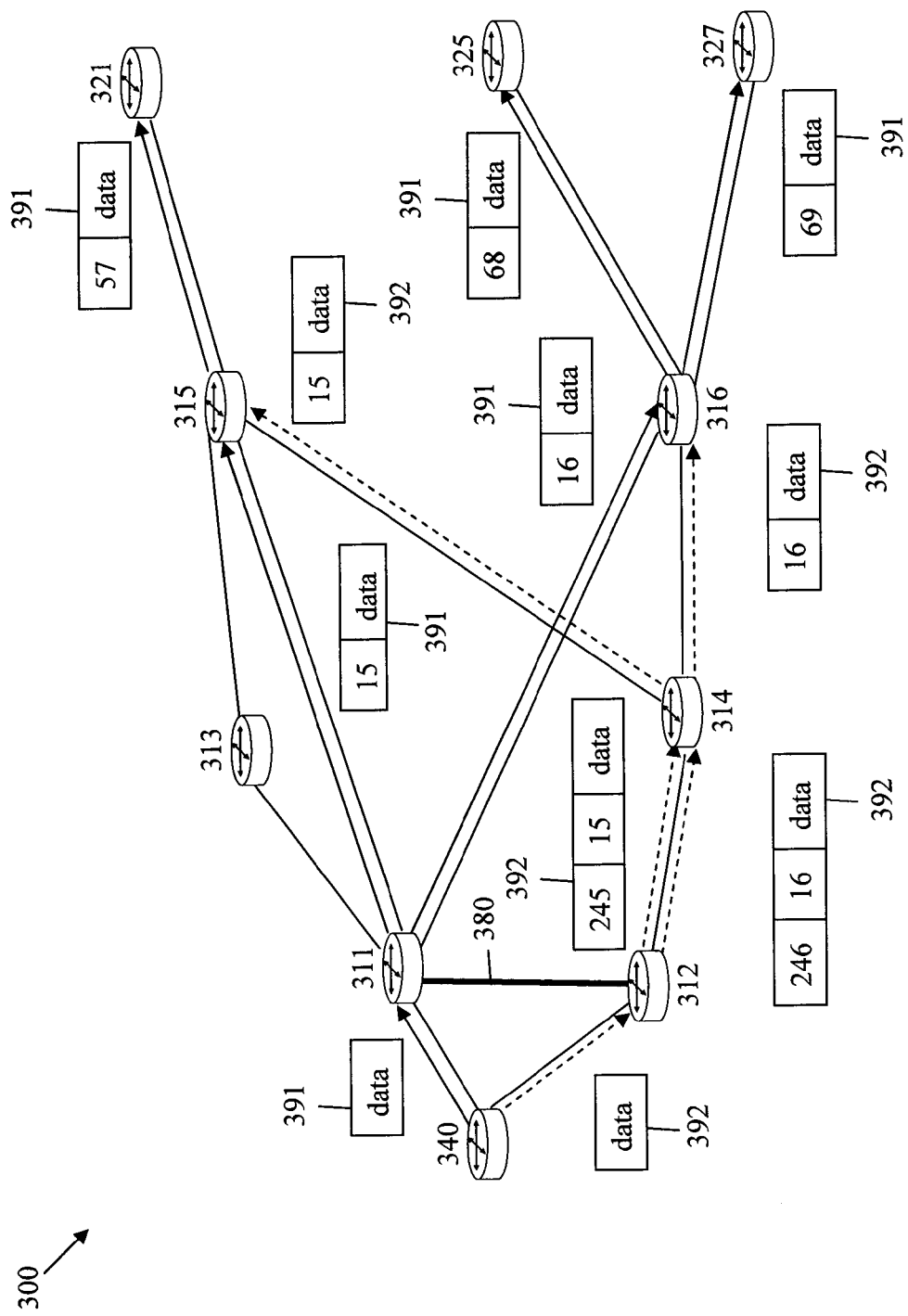
FIG. 3 is a schematic diagram of an embodiment of an ingress node protection by a P2P bypass tunnel.

FIG. 3 illustrates one embodiment of an ingress node protection scheme 300. The ingress node protection scheme 300 may be used in a label switched system, such as the label switched system 200. The label switched system may comprise a first ingress node 311, a second ingress node 312, a plurality of internal nodes 313, 314, 315, and 316, and a plurality of egress nodes 321, 325, and 327. The first ingress node 311, the second ingress node 312, and the egress nodes 321, 325, and 327 may be edge nodes in a label switched network, and the internal nodes 313, 314, 315, and 316 may be internal nodes in the label switched network. The different nodes in the network may communicate via links (e.g. wired links) with one another. The links between the nodes are shown by the solid lines in FIG. 3. The label switched network may be used to transport multicast traffic from an external node 340, e.g. in an external network, to a plurality of clients or client networks (not shown). Accordingly, the external node 340 may be coupled to the first ingress node 311 and the second ingress node 312, and the clients or client networks may be coupled to the egress nodes 321, 325, and 327.

The multicast traffic may be transported through the label switched network via an established P2MP LSP. The P2MP LSP may comprise the first ingress node 311, the internal nodes 315 and 316, and the egress nodes 321, 325, and 327. The P2MP LSP is shown by the solid arrow lines from the first ingress node 311 to the egress nodes 321, 325 and 327. During normal operation, the first ingress node 311 may receive a packet 391 that comprises data from the external node 340, generate copies of the data packet 391, add a label to each copy for a next-hop node of the first ingress node 311 of the P2MP LSP (e.g., label 15 for the next-hop node 315 and label 16 for the next-hop node 316), and then multicast the packets downstream in the P2MP LSP.

For example, the first ingress node 311 may send a packet 391 that comprises the data and a label "15" to the internal node 315 and send another packet 391 that comprises the data and a label "16" to the internal node 316. The internal nodes 315 and 316 may remove the labels from the packets 391, add new labels, and then send the data in the P2MP LSP. For example, the internal node 315 may send a packet 391 that comprises the data and a label "57" to the egress node 321. The internal node 316 may send a packet 391 that comprises the data and a label "68" to the egress node 325 and send another packet 391 that comprises the data and a label "69" to the egress node 327.

The second ingress node 312 may be designated as the backup ingress node and may establish a backup LSP or a plurality of backup LSPs to provide protection against the failure of the first ingress node 311. Specifically, the backup LSPs may be P2P bypass tunnels, which may be used to route the traffic from the external node 340 to the next-hop nodes of the first ingress node of the P2MP LSP when the first ingress node fails. A P2P bypass tunnel may be assigned as a backup LSP for a plurality of P2MP LSPs and may be used to route traffic that may be associated with the different P2MP LSPs. When the second ingress node 312 is selected as the backup ingress node, the second ingress node 312 may establish a BFD interface 380 with the first ingress node 311 and establish a plurality of P2P bypass tunnels. Each of the P2P bypass tunnels may comprise the second ingress node 312 as its ingress and one of the next-hop nodes of the first ingress node as its egress. Two P2P bypass tunnels are shown by the dashed arrow lines. One P2P bypass tunnel is from the second ingress node 312 as its ingress to the next-hop node 315 as its egress via the internal node 314. The other P2P bypass tunnel is from the second ingress node 312 as its ingress to the next-hop node 316 as its egress via the internal node 314.

When the second ingress node 312 detects a failure in the first ingress node 311 using the BFD interface 380, the second ingress node 312 may inform the external node 340 of the failure, and hence receive a packet 392 that comprises data from the external node 340. The data may be the same as the data in the packet 391. Alternatively, the external node 340 may detect the failure of the first ingress node 311 via a BFD interface between the external node 340 and the first ingress node 311, and send a packet that comprises the data to the second ingress node 312 instead of the first ingress node 311 when the failure is detected. The second ingress node 312 may then forward the packet 392 through the P2P bypass tunnels to deliver the packet 392 to the next-hop nodes of the first ingress node 311 of the P2MP LSP. The second ingress node 312 may add a first label (e.g., label 245) to the packet 392, which is the label for the P2P bypass tunnel from the second ingress node 312 as its ingress to the next-hop node 315 as its egress via the internal node 314. Additionally, the second ingress node 312 may add a second label (e.g., label 15) to the packet 392, which is the label used by the first ingress node 311 for forwarding the data to the next-hop node 315 along the P2MP LSP.

For example, the second ingress node 312 may send to the internal node 314 a packet 392 that comprises the data, a first label with value of 245, and a second label with value of 15, and another packet 392 that comprises the data, a first label with value of 246, and a second label with value of 16, both of which are arranged as shown in FIG. 3. The internal node 314, which is a second last hop of each of the two P2P bypass tunnels, may receive the two packets 392 from two P2P bypass tunnels, remove the first label from each packet 392, and forward the packets 392 according to their second labels. Hence, the internal nodes 315 and 316 may receive their corresponding packets 392, which may comprise same information as the packets 391. The packets may then be processed and forwarded along the P2MP LSP to the corresponding egress nodes, same as during normal operation.

The P2P bypass tunnel may be used in many networks to protect against link, node, or path failures. Using the P2P bypass tunnel may also be advantageous since no substantial changes may be needed in the network to route the traffic, except for changes in the ingress node and the backup ingress node. Further, since the P2P bypass tunnel may be used to protect a plurality of P2MP LSPs from failures, network resources (e.g. bandwidth) may be conserved. However, in some cases, additional bandwidth may be needed after a failure occurs, such as when multiple copies of the traffic are forwarded from the backup ingress node to a plurality of next-hop nodes of the first ingress node of a P2MP LSP over the link between the backup ingress node (e.g., node 312) and a downstream node of the backup ingress node (e.g., node 314).

Figure 4:
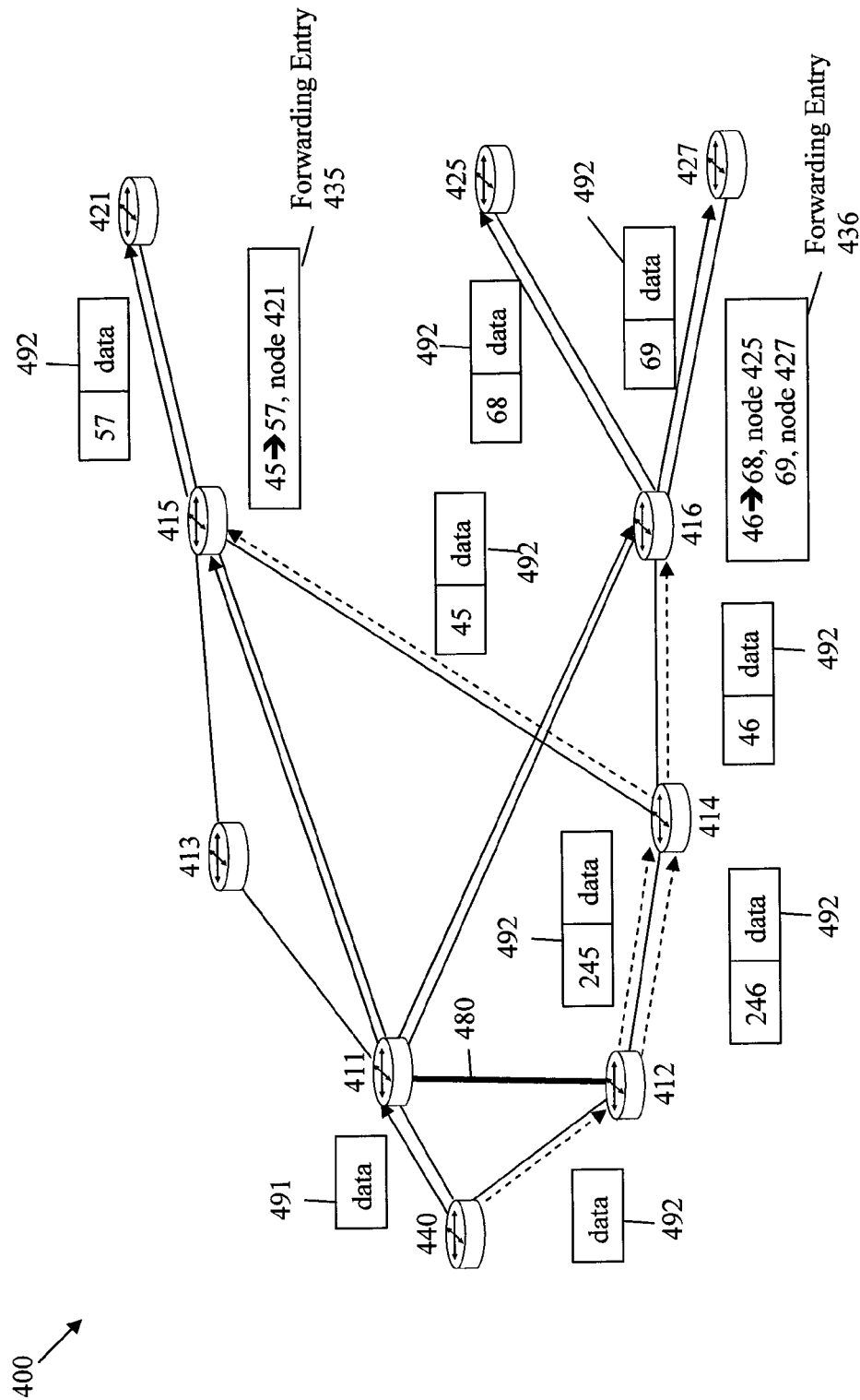
FIG. 4 is a schematic diagram of an embodiment of an ingress node protection by a P2P detour tunnel.

FIG. 4 illustrates one embodiment of another ingress node protection scheme 400, which may be used in a label switched system, e.g. the label switched system 200. The label switched system may comprise a first ingress node 411, a second ingress node 412, a plurality of internal nodes 413, 414, 415, and 416, and a plurality of egress nodes 421, 425, and 427. The first ingress node 411, the second ingress node 412, and the egress nodes 421, 425, and 427 may be edge nodes in a label switched network, and the internal nodes 413, 414, 415, and 416 may be internal nodes in the label switched network. Similar to the ingress node protection scheme 300, the different nodes in the ingress node protection scheme 400 may communicate via links (e.g. wired links) with one another. The links between the nodes are shown by the solid lines. The label switched network may be used to transport multicast traffic from an external node 440, e.g. in an external network, to a plurality of clients or client networks (not shown). Accordingly, the external node 440 may be coupled to the first ingress node 411 and the second ingress node 412, and the clients or client networks may be coupled to the egress nodes 421, 425, and 427.

The multicast traffic may be transported through the label switched network via an established P2MP LSP, which may be configured substantially similar to the P2MP LSP in the ingress node protection scheme 300. Similarly, the multicast traffic in the ingress node protection scheme 400 may be transported using a packet 491 and packet labeling. However, the second ingress node 412, which may be the backup ingress node, may establish a plurality of P2P detour tunnels as the backup LSPs. Unlike a P2P bypass tunnel, a P2P detour tunnel may be assigned to a single P2MP LSP and may be used to route the traffic associated with the P2MP LSP. A P2P detour tunnel may comprise the second ingress node 412 as its ingress and one of the next-hop nodes of the first ingress node 411 as its egress of the P2MP LSP. Two P2P detour tunnels are shown by the dashed arrow lines. One P2P detour tunnel is from the second ingress node 412 as its ingress to the next-hop node 415 as its egress via the internal node 414. The other P2P detour tunnel is from the second ingress node 412 as its ingress to the next-hop node 416 as its egress via the internal node 414.

When the second ingress node 412 detects a failure in the first ingress node 411 via a BFD interface 480 between the first ingress node 411 and the second ingress node 412, the second ingress node 412 may inform the external node 440 about the failure. Alternatively, the external node 440 may detect the failure of the first ingress node 411 via a BFD interface between the external node 440 and the first ingress node 411, and send a packet that comprises the data to the second ingress node 412 instead of the first ingress node 411 when the failure is detected. Thus, the second ingress node 412 may receive a packet 492 that comprises data from the external node 440. The data may be the same as the data in the packet 491. The second ingress node 412 may then forward the packet 492 through the P2P detour tunnels to deliver the packet 492 to the next-hop nodes of the first ingress node 411 of the P2MP LSP. The second ingress node 412 may add a label to the data packet for a P2P detour tunnel.

For example, the second ingress node 412 may send to the internal node 414 a packet 492 that comprises the data and a label with value of 245, and another packet 492 that comprises the data and a label with value of 246. The internal node 414 may receive the two packets 492 and replace the label in each packet 492 with a label that is allocated by the corresponding next-hop node for the P2P detour tunnel. For example, the internal node 414 may comprise an internal table or algorithm that associates label with value of 245 with label with value of 45 and label with value of 246 with label with value of 46. The internal node 414 may then forward the packets 492 according to the table. The internal node 414 may send to the internal node 415 a packet 492 that comprises the data and a label with value of 45, and may send to the internal node 416 another packet 492 that comprises the data and a label with value of 46. Hence, the internal nodes 415 and 416 may receive their corresponding packets 492, which may comprise similar information as the packets 491. The packets may then be processed and forwarded along the P2MP LSP to the corresponding egress nodes by the next-hop nodes 415 and 416 of the first ingress node of the P2MP LSP using forwarding entry 435 and 436 respectively.

The P2P detour tunnel may be used in some networks to protect against link, node, or path failures, but may not be widely used due to scalability issues. Using the P2P detour tunnel may require some changes in the network, e.g. in the ingress node and the next-hop nodes 415 and 416 of the first ingress node 411 of the P2MP LSP. Further, since the P2P detour tunnel may be used to protect a single P2MP LSP, a significant amount of bandwidth may be needed to protect multiple P2MP LSPs.

Figure 5:
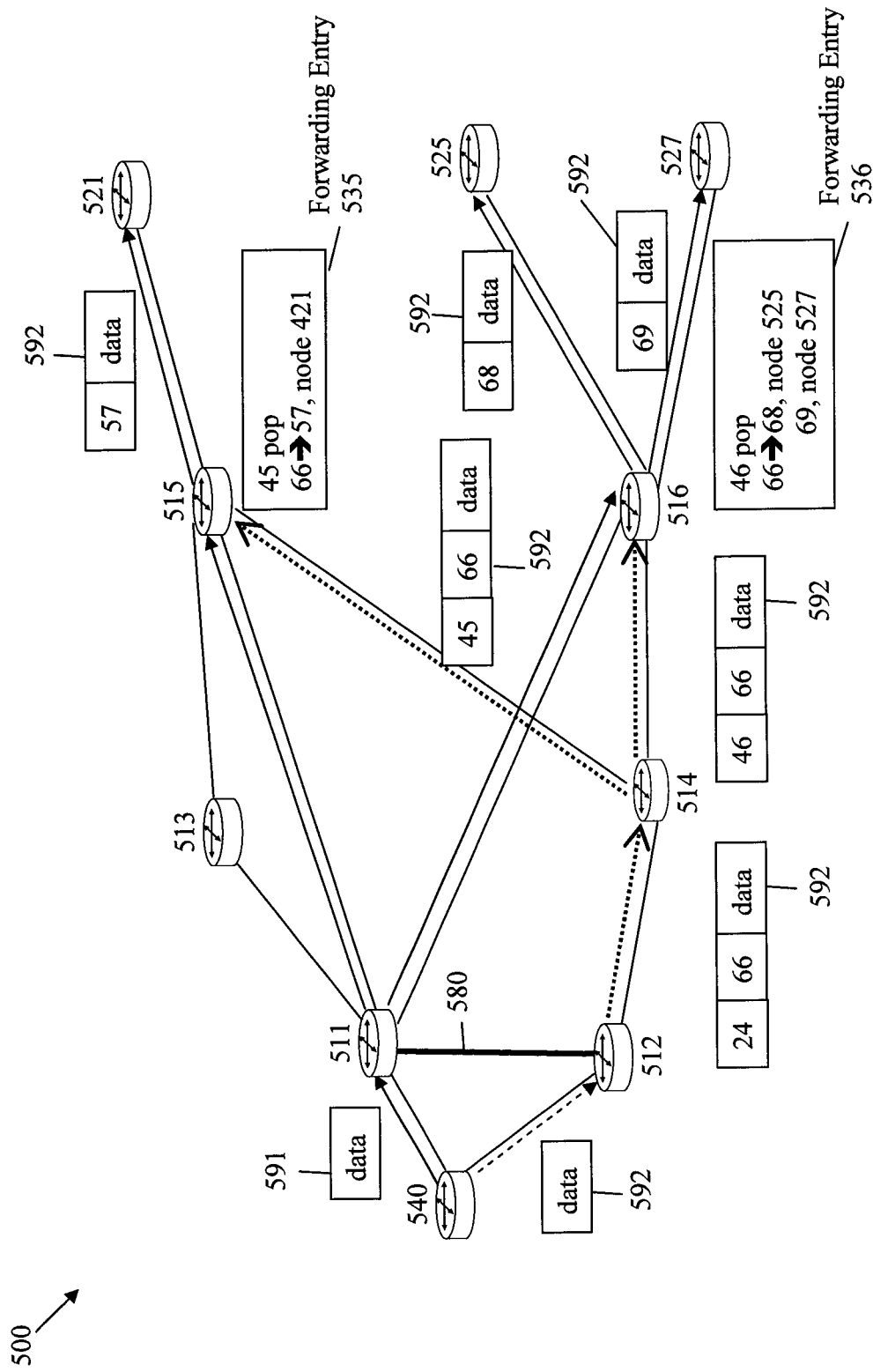
FIG. 5 is a schematic diagram of an embodiment of an ingress node protection by a P2MP bypass tunnel.

FIG. 5 illustrates one embodiment of an ingress node protection scheme 500, which may be used in a label switched system, e.g. the label switched system 200. The label switched system may comprise a first ingress node 511, a second ingress node 512, a plurality of internal nodes 513, 514, 515, and 516, and a plurality of egress nodes 521, 525, and 527. The first ingress node 511, the second ingress node 512, and the egress nodes 521, 525, and 527 may be edge nodes in a label switched network, and the internal nodes 513, 514, 515, and 516 may be internal nodes in the label switched network. As in the schemes above, the different nodes in the ingress node protection scheme 500 may communicate via links with one another. The label switched network may be used to transport multicast traffic from an external node 540 to a plurality of clients or client networks (not shown).

The multicast traffic may be transported through the label switched network via an established P2MP LSP, which may be configured substantially similar to the P2MP LSP in the schemes above. Accordingly, the multicast traffic may be transported using a packet 591 and packet labeling. However, the second ingress node 512, which may be the backup ingress node, may establish a P2MP bypass tunnel as the backup LSP. The P2MP bypass tunnel may be a tree that transports multicast traffic from a root to a plurality of leaves, and may be associated with a plurality of P2MP LSPs. The P2MP bypass tunnel may comprise the second ingress node 512, which may be the root, the internal node 514, and the internal nodes 515 and 516, which may be the leaves. The P2MP bypass tunnel from the second ingress node 512 as its root to the next-hop nodes 515 and 516 of the first ingress node 511 of the P2MP LSP as leaves is shown by the dotted arrow lines.

When the second ingress node 512 detects a failure in the first ingress node 511, e.g. via a BFD interface 580 between the two ingress nodes, the second ingress node 512 may inform the external node 540. Alternatively, the external node 540 may detect the failure of the first ingress node 511 via a BFD interface between the external node 540 and the first ingress node 511, and send a packet that comprises the data to the second ingress node 512 instead of the first ingress node 511 when the failure is detected. Thus, the second ingress node 512 may receive a packet 592 that comprises data from the external node 540. The data may be the same as the data in the packet 591. The second ingress node 512 may then forward the packet 592 through the P2MP bypass tunnel to deliver the packet 592 to the next-hop nodes 515 and 516 of the first ingress node 511 of the P2MP LSP. The second ingress node 512 may add a first label to the packet 592 that is allocated for the P2MP bypass tunnel. Additionally, the second ingress node 512 may add a second label that is allocated by the second ingress node 512, which is sent to the next-hop nodes 515 and 516 of the first ingress node 511 of the P2MP LSP.

For example, the second ingress node 512 may send to the internal node 514 a packet 592 that comprises the data, a first label with value of 24, and a second label with value of 66 arranged as shown in FIG. 5. The first label with value of 24 may be allocated by the internal node 514 and sent to the second ingress node 512 for the P2MP bypass tunnel. The second label with value of 66 may be allocated by the second ingress node 512 and sent to the next-hop nodes 515 and 516 of the first ingress node 511 of the P2MP LSP. The internal node 514 may receive the packet 592, generate copies of the packet 592, replace the first label in each copy with a new first label for the P2MP bypass tunnel, and then send the packets 592 downstream. The internal node 514 may send a packet 592 that comprises the data, a first label with value of 45, and the second label with value of 66 to the internal node 515, and may send another packet 592 that comprises the data, a first label with value of 46, and the second label with value of 66 to the internal node 516. Hence, the internal nodes 515 and 516 may receive their corresponding packets 592, which may comprise similar information as the packets 591. The packets may then be processed and forwarded along the P2MP LSP to the corresponding egress nodes by the next-hop nodes 515 and 516 of the first ingress node 511 of the P2MP LSP using forwarding entry 535 and 536 respectively.

Providing and configuring the P2MP bypass tunnel in a label switched network is currently undergoing to protect against link, node, or path failures. Since the P2MP bypass tunnel may be used to protect a plurality of P2MP LSPs from failures, network resources (e.g. bandwidth) may be conserved. However, using the P2MP bypass tunnel may require substantial changes in the network, e.g. in the ingress node and the next-hop nodes of the first ingress node of the P2MP LSP. Further, establishing the P2MP bypass tunnel may add complexity and require additional support, such as upper stream label assignment.

Figure 6:
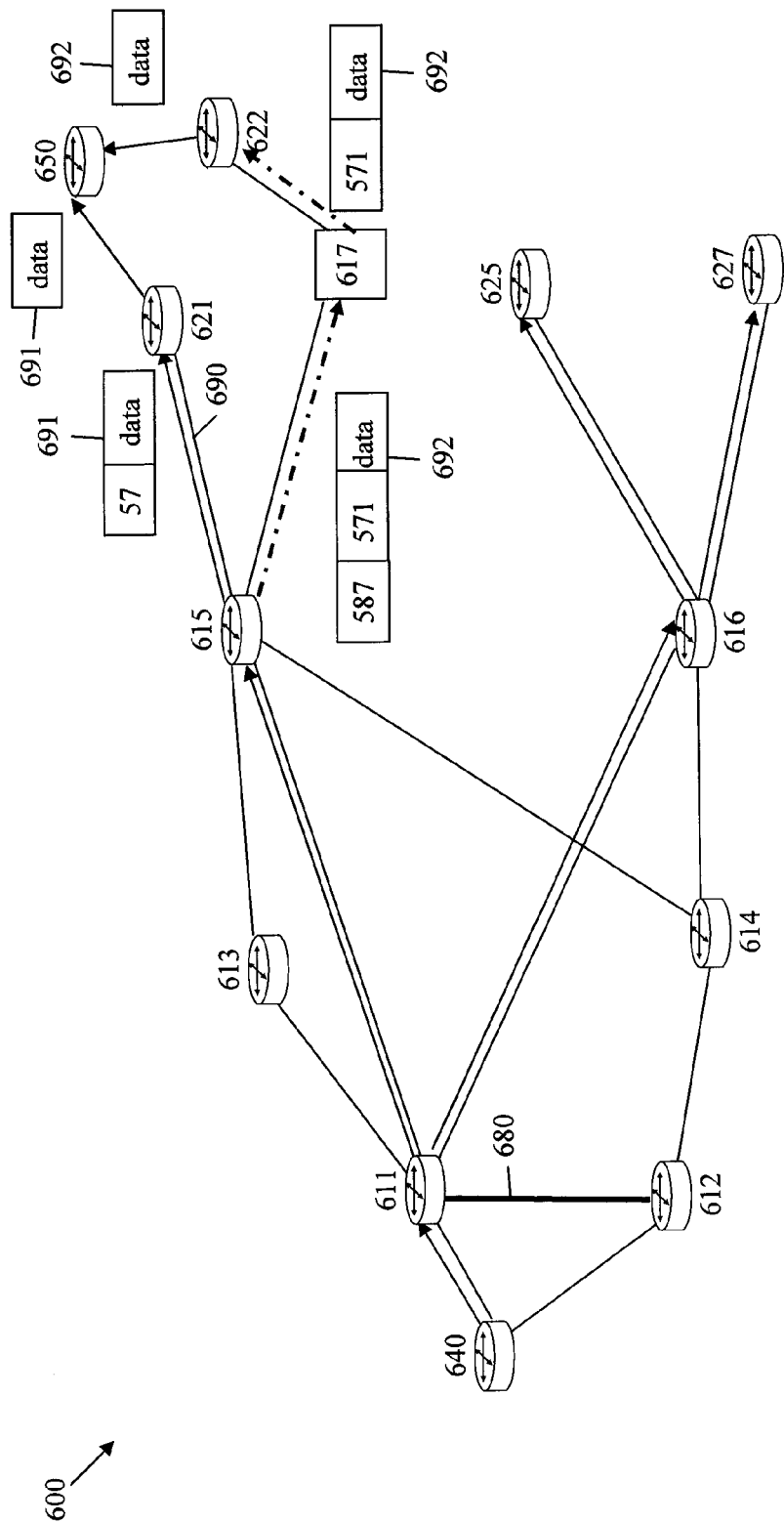
FIG. 6 is a schematic diagram of an embodiment of an egress node protection by a P2P bypass tunnel.

FIG. 6 illustrates one embodiment of an egress node protection scheme 600, which may be used in a label switched system, e.g. the label switched system 200. The label switched system may be configured substantially similar to the label switched systems in the embodiments above. The label switched system may comprise an external node 640, a first ingress node 611, a second ingress node 612, a plurality of internal nodes 613, 614, 615, 616, and 617, and a plurality of egress nodes 621, 622, 625, and 627. The multicast traffic may be transported through the label switched network via an established P2MP LSP, which may be configured substantially similar to the P2MP LSP in the ingress protection schemes above. Accordingly, the multicast traffic may be transported using a packet 691 and packet labeling as shown above.

Additionally, to provide protection against the failure of the first egress node 621, the second egress node 622 may be designated as the backup egress node and accordingly a backup LSP may be established. Specifically, the backup LSP may be a P2P bypass tunnel, which may be used to route the traffic from a previous-hop node of the first egress node 621 to the second egress node 622 when the first egress node 621 fails. As such, the second egress node 622 may forward the traffic to a client node 650, which may be coupled to the first egress node 621 and the second egress node 622, and be a receiver of the traffic. The P2P bypass tunnel may be assigned as a backup LSP for a plurality of P2MP LSPs and may be used to route traffic associated with the different P2MP LSPs. When the second egress node 622 is selected as the backup egress node, the previous-hop node of the first egress node 621, such as the internal node 615, may establish a BFD interface 690 with the first egress node 621 and the P2P bypass tunnel may be established. The P2P bypass tunnel may comprise the internal node 615, the internal node 617, and the second egress node 622. The internal node 617 and the second egress node 622 may not belong to the P2MP LSP. The P2P bypass tunnel is shown by the dashed and dotted arrow lines.

When the internal node 615 detects a failure in the first egress node 621 using the BFD interface 690, the internal node 615 may send a packet 692 to the second egress node 622 instead of sending the packet 691 to the first egress node 621. The packet 692 may comprise the same data as the packet 691. The internal node 615 may also inform the first ingress node 611 and/or the second egress node 622 of the failure of the first egress node 621. The packet 692 may then be forwarded through the P2P bypass tunnel to deliver the data to the client node 650. The internal node 615 may add a first label to the packet 692 that is the label allocated by the downstream node 617 of the node 615 for the P2P bypass tunnel from the previous-hop node 615 of the egress node 621 to the second egress node 622. Additionally, the internal node 615 may add a second label that is for an assumed P2MP sub LSP segment from the previous-hop node 615 of the egress node 621 to the second egress node 622. The second label may distinguish between the packets that may belong to different P2MP LSPs.

For example, the previous-hop node 615 of the egress node 621 may send to the internal downstream node 617 the packet 692 that comprises the data, a first label with value of 587, and a second label with value of 571 arranged as shown in FIG. 6. The first label with value of 587 may be the label allocated for the P2P bypass tunnel by the downstream node 617, which is the next-hop node of the node 615. The second label with value of 571 may be the label allocated by the downstream node 617 for the assumed P2MP sub LSP segment from the node 615 to the second egress 622. The internal node 617 may receive the packet 692, remove the first label from the packet 692, and forward the packet 692 according to its second label. Hence, the second egress node 622 may receive the packet 692, which may comprise similar information as the packet 691. The packet 692 may then be forwarded to the client node 650.

Figure 7:
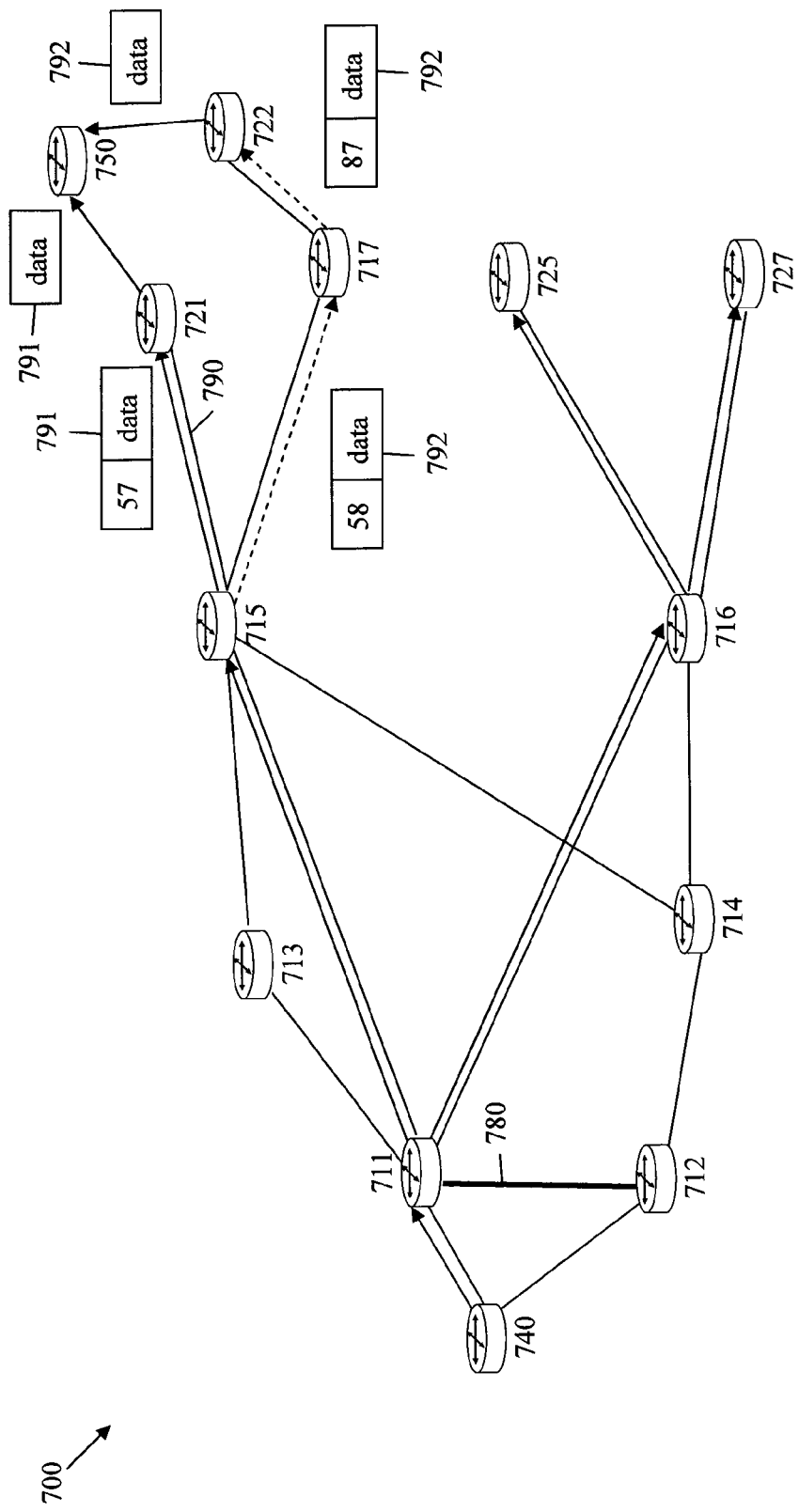
FIG. 7 is a schematic diagram of an embodiment of an egress node protection by a P2P detour tunnel.

FIG. 7 illustrates one embodiment of an egress node protection scheme 700, which may be used in a label switched system, e.g. the label switched system 200. The label switched system may be configured substantially similar to the label switched systems in the embodiments above and may comprise an external node 740, a first ingress node 711, a second ingress node 712, a plurality of internal nodes 713, 714, 715, 716, and 717, and a plurality of egress nodes 721, 722, 725, and 727. The multicast traffic may be transported through the label switched network via an established P2MP LSP, which may be configured substantially similar to the P2MP LSP in the ingress protection schemes above. Accordingly, the multicast traffic may be transported using a packet 791 and packet labeling as shown above.

Additionally, to provide protection against the first egress node 721 failure, the second egress node 722 may be designated as the backup egress node and accordingly a backup LSP may be established. Specifically, the backup LSP may be a P2P detour tunnel and may be used to route the traffic from a previous-hop node of the first egress node 721 to the second egress node 722, when the first egress node 721 fails. Hence, the second egress node 722 may forward the traffic to a client node 750, which may be coupled to the first egress node 721 and the second egress node 722 and be a receiver of the traffic. The P2P detour tunnel may be assigned as a backup LSP for a single P2MP LSP and may be used to route traffic that may be transported by the P2MP LSP segment from the previous-hop node 715 to the first egress node 721. When the second egress node 722 is selected as the backup egress node, the previous-hop node of the first egress node 721, which may be the internal node 715, may establish a BFD interface 790 with the first egress node 721 and the P2P detour tunnel from the previous-hop node 715 to the second egress node 722 may be established. The P2P detour tunnel may comprise the internal node 715, the internal node 717, and the second egress node 722. The internal node 717 and the second egress node 722 may not be in the P2MP LSP. The P2P detour tunnel is shown by the dashed arrow lines.

When the internal node 715 detects a failure in the first egress node 721 using the BFD interface 790, the internal node 715 may forward a packet 792 to the second egress node 722 instead of forwarding the packet 791 to the first egress node 721. The packet 792 may comprise the same data as the packet 791. The internal node 715 may also inform the first ingress node 711 and/or the second egress node 722 of the failure of the first egress node 721. The internal node 715 may then forward the packet 792 through the P2P detour tunnel to deliver the data to the client node 750. The internal node 715 may add a label to the packet 792 that is the label allocated by the next-hop node 717 of the node 715 for the P2P detour tunnel from the node 715 to the second egress node 722.

For example, the internal node 715 may send to the internal node 717 the packet 792 that comprises the data and a label with value of 58. The first label with value of 58 may be allocated by the internal node 717 for the P2P detour tunnel from the node 715 to the second egress node 722. The internal node 717 may receive the packet 792 and replace the label in the packet 792 with a label with value of 87, which is the label allocated by the next-hop of the node 717 for the P2P detour tunnel. For example, the internal node 717 may comprise an internal table or algorithm that associates label with value of 58 with label with value of 87. The internal node 717 may then forward the packet 792 according to the table. The internal node 717 may send to the second egress node 722 the packet 792 that comprises the data and a label with value of 87. Hence, the second egress node 722 may receive the packet 792, which may comprise similar information as the packet 791. The packet 792 may then be forwarded to the client node 750.

Figure 8:
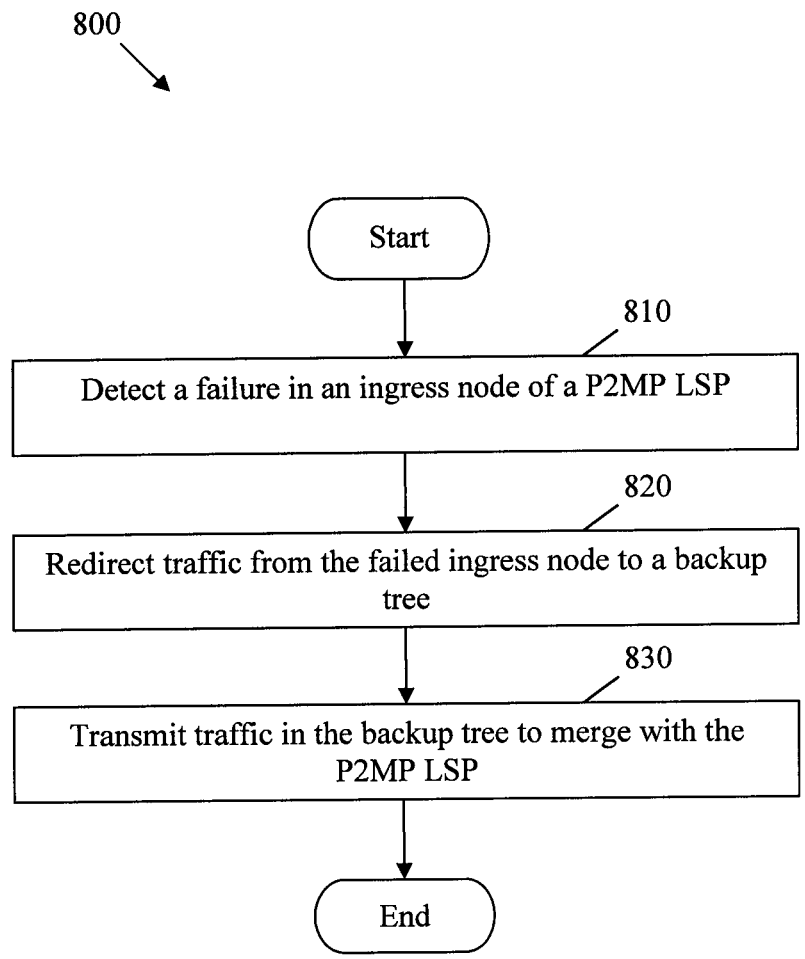
FIG. 8 is an illustration of one embodiment of a backup ingress node routing method.

FIG. 8 illustrates an embodiment of a backup ingress node routing method 800, which may be used to direct traffic when an ingress node fails in a label switched system, such as the label switched system 200. The method 800 may begin at block 810, where a failure of the ingress node of a P2MP LSP may be detected. The ingress node may belong to a P2MP LSP in the label switched system, which may be used to multicast services from a provider to a plurality of clients. For instance, a backup ingress node that may be assigned to the ingress node may detect the failure of the ingress node via a BFD interface with the ingress node. At block 820, traffic may be redirected from the failed ingress node to a backup tree. For instance, the backup ingress node may inform the provider of the failure of the ingress node and as such the provider sends the traffic to the second ingress node instead of the first ingress node. At block 830, the traffic may be transmitted in the backup tree to merge into the P2MP LSP. For example, the traffic may be transmitted to the backup ingress node to a plurality of next-hop nodes of the first ingress node of the P2MP LSP. The traffic may be forwarded via a plurality of P2P bypass tunnels or a plurality of detour tunnels or a P2MP bypass tunnel. The traffic may be forwarded via the backup LSPs using an appropriate labeling scheme as described above. When the traffic merges into the P2MP LSP, normal operations may be resumed to multicast the traffic to the clients. The method 800 may then end.

Figure 9:
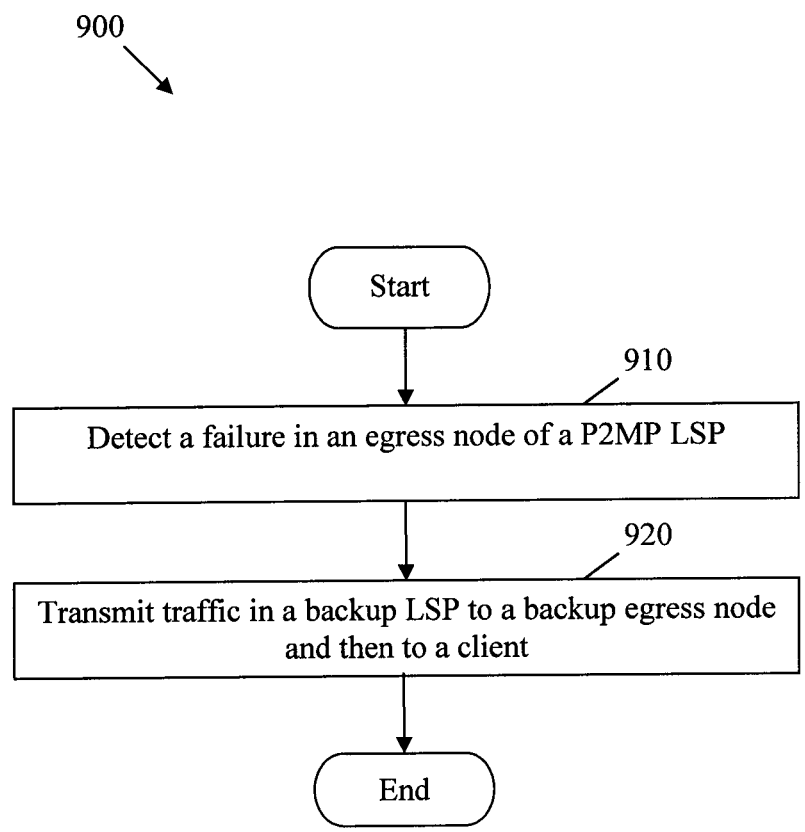
FIG. 9 is an illustration of one embodiment of a backup egress node routing method.

FIG. 9 illustrates an embodiment of a backup egress node routing method 900, which may be used to direct traffic when an egress node fails in a label switched system, such as the label switched system 200. The method 900 may begin at block 910, where a failure of the egress node of a P2MP LSP may be detected. The egress node may belong to a P2MP LSP in the label switched system, which may be used to multicast services from a provider to a plurality of clients. For instance, a previous-hop node of the egress node may detect the failure of the egress node via a BFD interface with the egress node. At block 920, traffic may be transmitted in a backup LSP to the backup egress node instead of the failed egress node. For instance, the previous-hop node of the egress node may send traffic to the backup egress node instead of the failed egress node. The backup LSP may comprise the previous-hop node of the egress node and the backup egress node. The traffic may be forwarded via the backup LSP using an appropriate labeling scheme as described above. The traffic may be transmitted in the backup LSP to deliver multicast services to the clients. The method 900 may then end.

Figure 10:
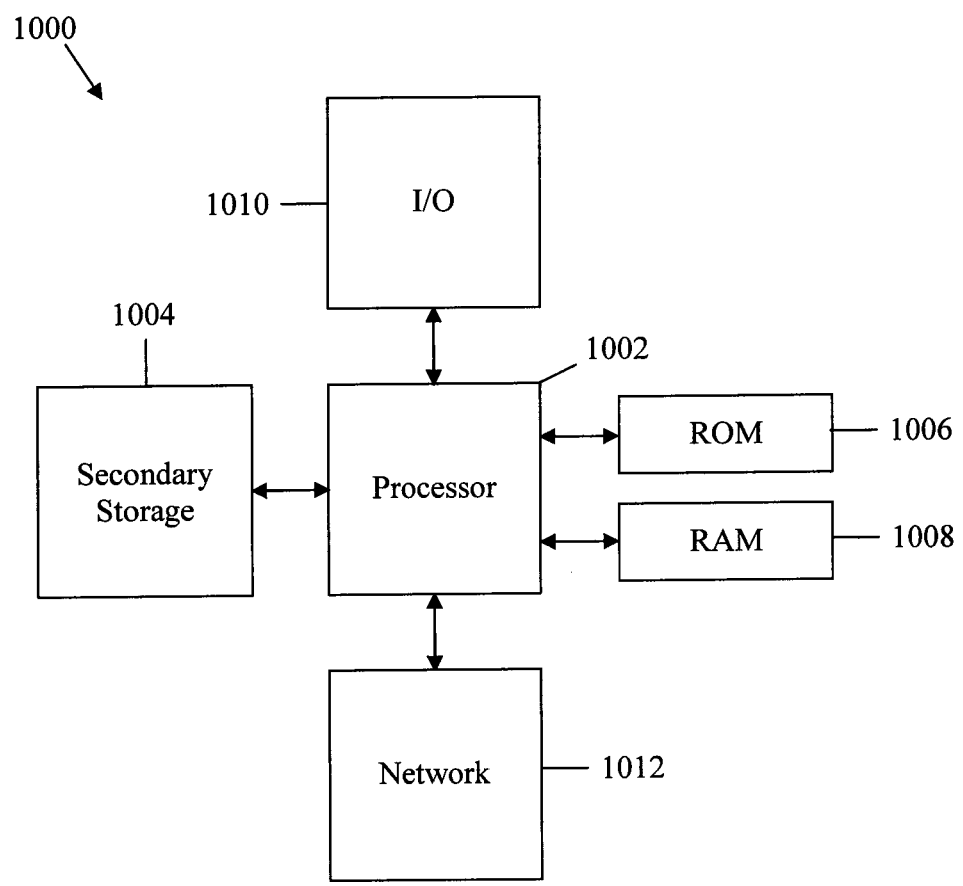
FIG. 10 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs).

The secondary storage 1004 is typically comprised of one or more disk drives or erasable programmable ROM (EPROM) and is used for non-volatile storage of data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a backup node configured to couple to an ingress node of a protected point-to-multipoint (P2MP) label switched path (LSP) and to at least one next-hop node of the ingress node of the protected P2MP LSP via a backup tree,
wherein the backup tree begins at the backup node,
wherein the backup tree is configured to carry data packets that are redirected after detection of a failure in the ingress node,
wherein the backup node and the ingress node are both coupled to an external node,
wherein the backup node and the ingress node are edge nodes for a label switched network (LSN),
wherein the external node delivers traffic to both the ingress node and the backup node, and
wherein the backup node is configured to ensure that the data packets received at the backup node will continue to be delivered along the protected P2MP LSP by transmitting the data packets to the at least one next-hop node when the ingress node fails.

2. The apparatus of claim 1, wherein the protected P2MP LSP further comprises a plurality of egress nodes and is configured for data multicasting from the ingress node to the egress nodes.

3. The apparatus of claim 1, wherein the protected P2MP LSP comprises an egress node and a previous-hop node of the egress node, wherein the previous-hop node is coupled to a backup egress node via a backup LSP, wherein the backup egress node and the egress node are both coupled to an external client, and wherein the previous-hop node of the egress node and the backup egress node are configured to ensure data delivery to the external client when the egress node fails.

4. The apparatus of claim 3, wherein the backup LSP is a point-to-point (P2P) bypass tunnel from the previous-hop node of the egress node to the backup egress node.

5. The apparatus of claim 3, wherein the backup egress node is computed through a Path Computation Element (PCE) and the information about the backup egress node is sent to the egress node and the previous-hop node of the egress node via the ingress node in a Resource Reservation Protocol-Traffic Engineering (RSVP-TE) PATH message.

6. The apparatus of claim 3, wherein the egress node sends the information about forwarding the data to a client to the backup egress node via the previous-hop node of the egress node in a Resource Reservation Protocol-Traffic Engineering (RSVP-TE) reservation (RESV) message and the previous-hop node sends the information to the backup egress node in a RSVP-TE PATH message.

7. The apparatus of claim 6, wherein the backup egress node creates a forwarding entry according to the information about forwarding the data to the client after receiving the information for forwarding the data to the client in the PATH message.

8. The apparatus of claim 3, wherein the egress node sends the information about forwarding the data to a client to the backup egress node in an Open Shortest Path First (OSPF) type 9 Link State Advertisement (LSA).

9. The apparatus of claim 8, wherein the backup egress node creates a forwarding entry according to the information about forwarding the data to the client after receiving the information for forwarding the data to the client in the OSPF type 9 LSA.

10. The apparatus of claim 1, wherein the at least one next-hop node is a plurality of next-hop nodes, wherein the backup tree is a plurality of point-to-point (P2P) bypass tunnels, and wherein each of the P2P bypass tunnels is from the backup node to one of the next-hop nodes of the ingress node of the protected P2MP LSP.

11. The apparatus of claim 1, wherein the at least one next-hop node is a plurality of next-hop nodes, wherein the backup tree is a plurality of point-to-point (P2P) detour tunnels, and wherein each of the P2P detour tunnels is from the backup node to one of the next-hop nodes of the ingress node of the protected P2MP LSP.

12. The apparatus of claim 1, wherein the at least one next-hop node is a plurality of next-hop nodes, and wherein the backup tree is a P2MP bypass tunnel from the backup node to the next-hop nodes of the ingress node of the protected P2MP LSP.

13. The apparatus of claim 1, wherein the backup node is computed through a Path Computation Element (PCE) and the information about the backup node is sent to the ingress node and the information about the ingress node and the protected P2MP LSP is sent to the backup node.

14. The apparatus of claim 1, wherein the backup node is configured to receive the identity of the at least one next-hop node from the ingress node prior to the failure, and wherein the backup tree is determined before detection of the failure in the ingress node.

15. A network component comprising:
at least one processor configured to:
    detect a failure in an ingress node of a point-to-multipoint (P2MP) label switched path (LSP), wherein the P2MP LSP comprises the ingress node, at least one egress node, and at least one next-hop node directly connected to the ingress node;
    receive from a provider node a data packet destined for the ingress node and to be transported by the P2MP LSP when the ingress node fails; and
    transmit the data packet on a backup tree that merges with the P2MP LSP at the at least one next-hop node, wherein the backup tree begins at the network component and terminates at the at least one next-hop node, and wherein the network component and the ingress node are edge nodes for a label switched network.

16. The network component of claim 15, wherein the processor is further configured to inform the provider node of the failure of the ingress node after detecting the failure and prior to receiving the data packet.

17. The network component of claim 15, wherein the failure of the ingress node is detected using a Bi-directional Forwarding Detection (BFD) interface with the ingress node.

18. The network component of claim 17, wherein the network component is directly connected to the ingress node via the BFD interface.

19. The network component of claim 15, wherein the at least one next-hop node is a plurality of next-hop nodes, wherein the backup tree is a plurality of point-to-point (P2P) bypass tunnels and each of the P2P bypass tunnels is to one of the next-hop nodes of the ingress node of the P2MP LSP, and wherein transmitting the data packet on the backup tree comprises:
    adding a first label to the data packet for each of the P2P bypass tunnels, which is the label for the P2P bypass tunnel to one of the next-hop nodes of the ingress node of the P2MP LSP; and
    adding a second label to the data packet, which is the label used by the ingress node of the P2MP LSP for forwarding the data to the next-hop node along the P2MP LSP.

20. The network component of claim 19, wherein a second last hop node of a P2P bypass tunnel removes the first label from the packet and transmits the data packet without pushing any other labels onto the data packet.

21. The network component of claim 19, wherein the next-hop node of the ingress node of the P2MP LSP swaps the first label of the data packet with a third label, and then transmits the data packet along the P2MP LSP.

22. The network component of claim 15, wherein the backup tree is a plurality of point-to-point (P2P) detour tunnels, wherein each of the P2P detour tunnels is to one of the next-hop nodes of the ingress node of the P2MP LSP, wherein transmitting the data packet on the backup tree comprises adding only one label to the data packet for each of the P2P detour tunnels, which is the label for the P2P detour tunnel to one of the next-hop nodes of the ingress node of the P2MP LSP, and wherein the next-hop node of the ingress node of the P2MP LSP swaps the first label of the data packet with a third label according to a forwarding entry, and then transmits the data packet along the P2MP LSP.

23. The network component of claim 15, wherein the backup tree is a P2MP bypass tunnel to the next-hop nodes of the ingress node of the P2MP LSP, and wherein transmitting the data packet on the backup tree comprises:
    adding a first label to the data packet for the P2MP bypass tunnel; and
    adding a second label to the data packet, which is the label allocated by the backup node and sent to the next-hop nodes of the ingress node of the P2MP LSP.

24. The network component of claim 23, wherein each of the next-hop nodes of the ingress node of the P2MP LSP removes the first label of the data packet and swaps the second label with a third label according to a forwarding entry created based on the P2MP bypass tunnel and the second label.

25. The network component of claim 15, wherein at least one processor is further configured to:
    receive information about the P2MP LSP and the ingress node; and
    establish the backup tree based on the information,
    wherein establishing the backup tree comprises computing a path to each of the next-hop nodes of the ingress node of the P2MP LSP, sending a PATH message along the computed path, receiving a reservation (RESV) message in return, and creating a forwarding state for the path.

26. The network component of claim 15, wherein the at least one processor is further configured to establish the backup tree before detecting the failure in the ingress node.

27. A method performed in a network node that is part of a point-to-multipoint (P2MP) label switched path (LSP) comprising an egress node, the method comprising:
    establishing a backup LSP to a backup egress node in case of a failure of the egress node, wherein the backup LSP originates at the network node and extends to the backup egress node without any intervening nodes;
    detecting a failure in the egress node;
    receiving a data packet destined for the egress node via an upstream portion of the P2MP LSP after detecting the failure; and
    transmitting the data packet on the backup LSP to the backup egress node after the egress node fails.

28. The method of claim 27, wherein transmitting the data packet on the backup LSP comprises adding a first label that is the label allocated for a point-to-point (P2P) bypass tunnel to a backup egress node and adding a second label that is for a P2MP sub LSP segment to the backup egress node, and wherein the backup LSP is associated at least with one P2MP LSP.

29. The method of claim 27, wherein there are no network nodes between the network node and the egress node, and wherein the failure is detected via a Bi-directional Forwarding Detection (BFD) session between the network node and the egress node.

30. A method to locally protect an ingress node of a primary protected point-to-multipoint (P2MP) label switched path (LSP) implemented in a backup ingress node, wherein the method comprises:
    maintaining a Bi-directional Forwarding Detection (BFD) session between the ingress node and the backup ingress node, wherein the backup ingress node is a label edge router (LER);
    setting up a backup LSP subtree that begins from the backup ingress node and merges with a protected P2MP LSP, wherein the protected P2MP LSP comprises a plurality of next-hop nodes from the ingress node, wherein the backup LSP subtree begins at the backup ingress node, terminates at a next-hop node only one logical hop away from the ingress node, and merges traffic into the protected P2MP LSP at the next-hop node;

detecting a failure of the ingress node via the BFD session;

receiving data traffic from a source;

importing the data traffic into the backup P2MP subtree; and sending the data traffic to the next hop node.

31. A method implemented in a previous hop node of an egress node, wherein the method comprises:

maintaining a Bi-directional Forwarding Detection (BFD) session with the egress node;

setting up a backup sub label switched path (LSP) to a backup egress node, wherein the egress node and the backup egress node are each coupled to a destination, and wherein the backup sub LSP originates at the previous hop node and extends to the backup egress node without any intervening nodes;

detecting a failure of the egress node via the BFD session;

importing data traffic from a protected point-to-multipoint (P2MP) LSP into the backup sub LSP, wherein the protected P2MP LSP was previously established to include the egress node; and sending the data traffic to the destination on the backup sub LSP through the backup egress node.

* * * * *